United States Patent
Smith et al.

(10) Patent No.: US 11,880,358 B2
(45) Date of Patent: Jan. 23, 2024

(54) DATA LEAKAGE AVOIDANCE IN A DATA SHARING PLATFORM

(71) Applicant: Cisco Technology, Inc., San Jose, CA (US)

(72) Inventors: Trevor George Smith, Leatherhead (GB); Oliver James Bull, Bristol (GB); Gaétan Feige, L'Hay les Roses (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 135 days.

(21) Appl. No.: 17/476,951

(22) Filed: Sep. 16, 2021

(65) Prior Publication Data

US 2023/0082693 A1    Mar. 16, 2023

(51) Int. Cl.
| | |
|---|---|
| *G06F 16/242* | (2019.01) |
| *G06F 16/248* | (2019.01) |
| *G06F 21/31* | (2013.01) |
| *G06F 21/62* | (2013.01) |

(52) U.S. Cl.
CPC ........ *G06F 16/2423* (2019.01); *G06F 16/248* (2019.01); *G06F 21/31* (2013.01); *G06F 21/6227* (2013.01)

(58) Field of Classification Search
CPC .... G06F 16/2423; G06F 16/248; G06F 21/31; G06F 21/6227
See application file for complete search history.

(56) References Cited

U.S. PATENT DOCUMENTS

| | | | |
|---|---|---|---|
| 10,380,334 B2 | 8/2019 | Gopi et al. | |
| 10,438,013 B2 * | 10/2019 | Jacob | ........ G06N 5/04 |
| 10,719,567 B2 | 7/2020 | Antonopoulos et al. | |
| 10,831,826 B2 | 11/2020 | Pitschke | |
| 10,831,910 B2 | 11/2020 | Bhaskara et al. | |
| 2014/0310232 A1 * | 10/2014 | Plattner | ............ G06F 16/24539 707/602 |
| 2018/0114033 A1 | 4/2018 | Mathur | |
| 2021/0209077 A1 * | 7/2021 | Snellman | .............. G06F 16/219 |
| 2021/0374266 A1 * | 12/2021 | Goldfarb | ............ G06F 16/9024 |
| 2023/0078109 A1 * | 3/2023 | Samuel | .............. G06F 21/6254 |

OTHER PUBLICATIONS

"Ads Data Hub", online: https://developers.google.com/ads-data-hub, accessed Jul. 13, 2021, 6 pages.
"Filtered Row Summary", online: https://developers.google.com/ads-data-hub/guides/filtered-row-summary, Jan. 25, 2021, accessed Aug. 16, 2021, 2 pages.
"Privacy Checks in Ads Data Hub", online: https://developers.google.com/ads-data-hub/guides/privacy-checks, Oct. 27, 2020, 4 pages.

* cited by examiner

*Primary Examiner* — Jorge A Casanova (74) *Attorney, Agent, or Firm* — BEHMKE INNOVATION GROUP LLC; Kenneth J. Heywood; James J. Wong (57) ABSTRACT

In one embodiment, a device receives, from a requestor, a query function that queries a dataset and an intended use schema associated with the query function. The device determines, using a policy ruleset, whether the intended use schema falls within an available schema for the dataset. The device executes the query function on the dataset to form a result data, when the intended use schema falls within the available schema for the dataset. The device provides the result data to the requestor.

16 Claims, 8 Drawing Sheets

DATA LEAKAGE AVOIDANCE IN A DATA SHARING PLATFORM

TECHNICAL FIELD

The present disclosure relates generally to computer networks, and, more particularly, to data leakage avoidance in a data sharing platform.

BACKGROUND

In general, a data sharing platform allows data subjects to share their data with a variety of data consumers for various purposes. Typically, data access in a data sharing platform is simply a function of the identity of the data consumer. If the data consumer is authorized, they may access the data of a data subject. Thus, this security paradigm completely ignores how the data of the data subject is actually being used, focusing instead entirely on who is using the data. As a result, a data subject may be less inclined to share their data out of fear of that data being used for unintended purposes.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives, from a requestor, a query function that queries a dataset and an intended use schema associated with the query function. The device determines, using a policy ruleset, whether the intended use schema falls within an available schema for the dataset. The device executes the query function on the dataset to form a result data, when the intended use schema falls within the available schema for the dataset. The device provides the result data to the requestor.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
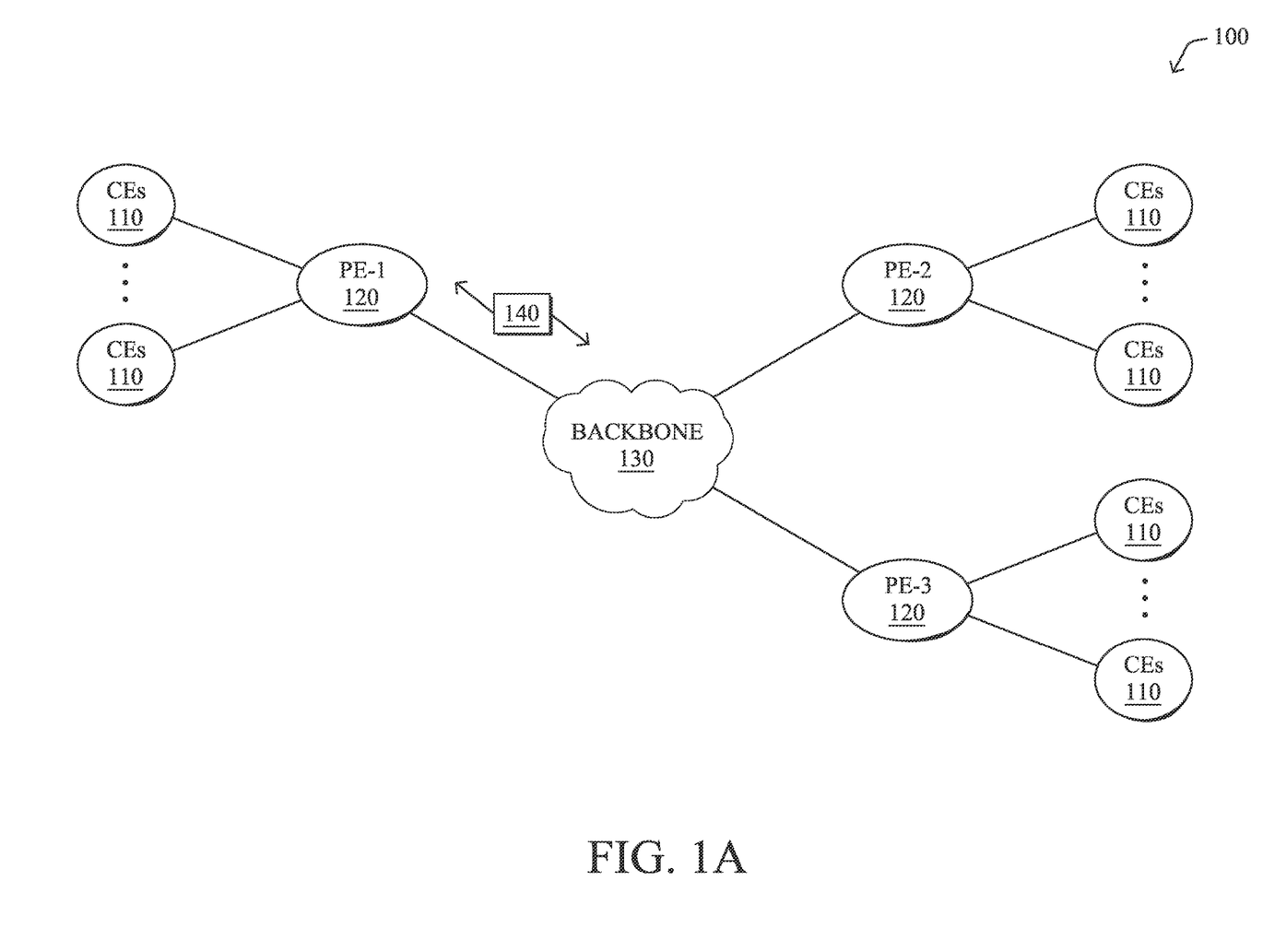
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
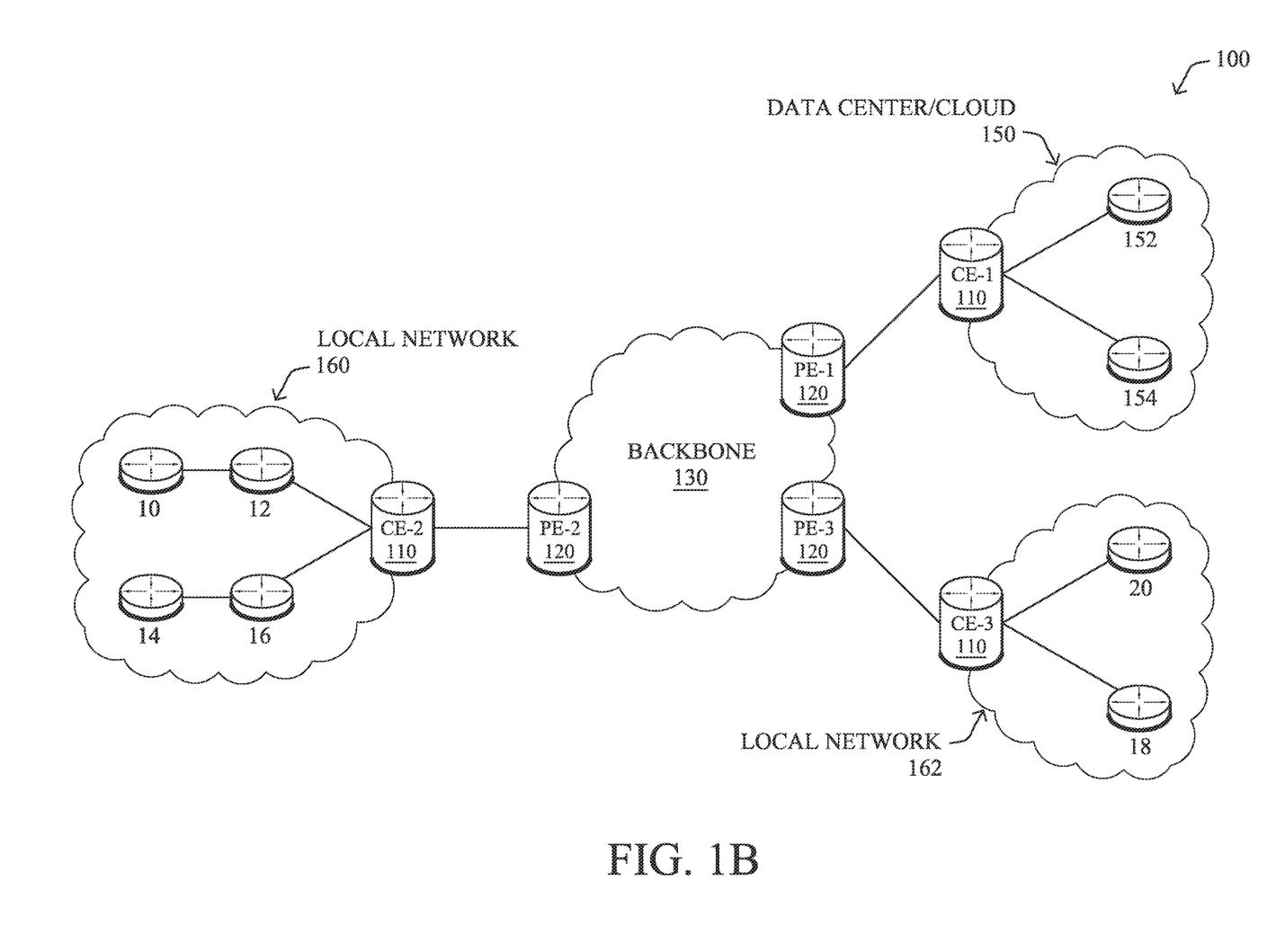

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
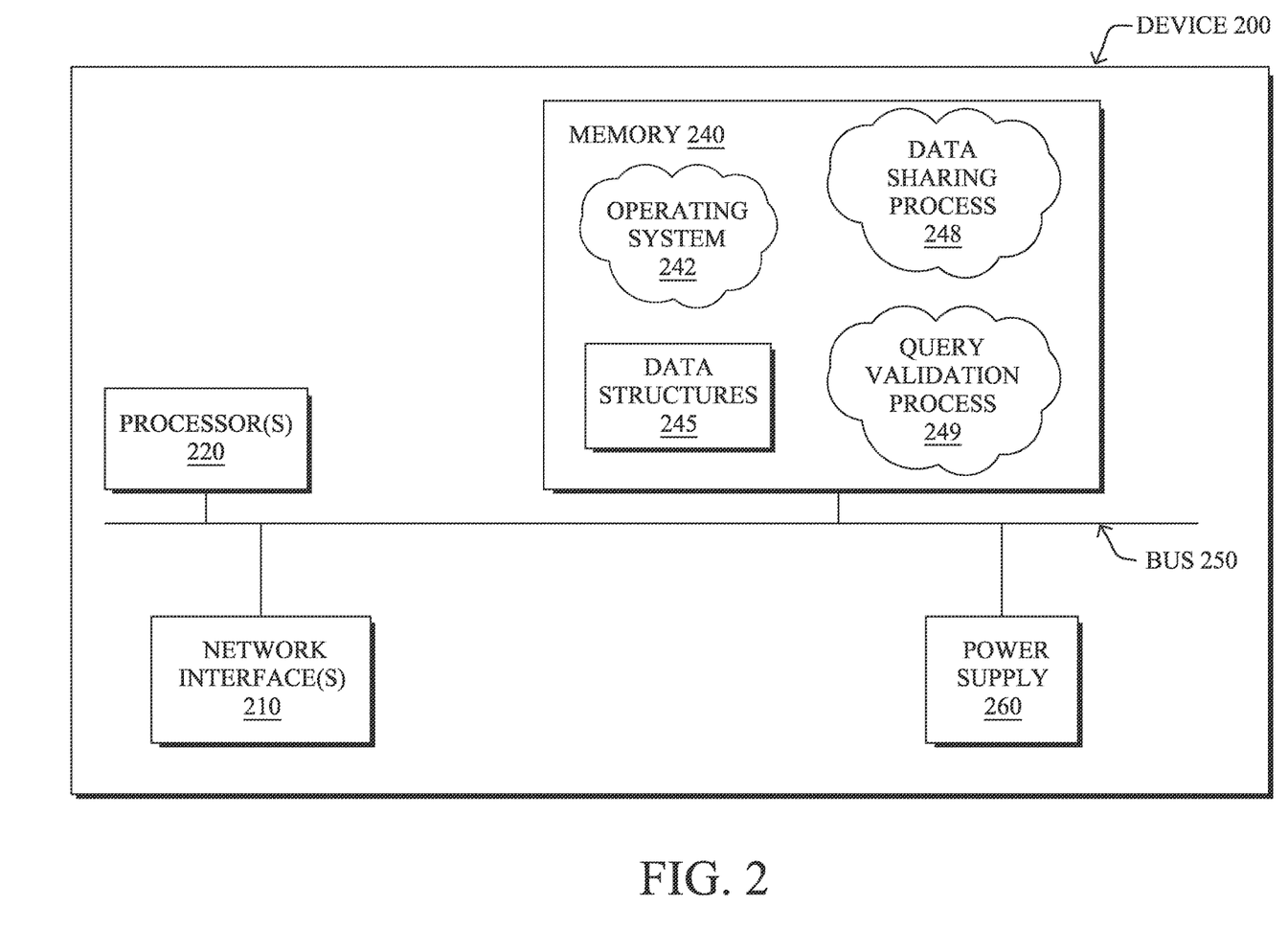
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data sharing process 248 and/or a query validation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, a data sharing platform allows data subjects to share their data with a variety of data consumers for various purposes. Typically, data consumers want to make use of 'decision layer' data on a data sharing platform. This is the data that originated from individual people (e.g., data subjects) and other contextualizing sources that has been cleaned, curated, and otherwise prepared for use. This decision layer data is valuable, both to the operator of the data sharing platform and to the data subject, both of whom wish to control its use.

In order to make use of decision layer data, a data consumer needs to access it. However, by simply granting access to the data based on the identity of the data consumer, both the data sharing platform and the data subject have lost control over what happens to the data afterwards. In some instances, this can be mitigated by entirely precomputing the result datasets for the data consumer and not exposing the decision layer at all to them. However, this is inefficient, inflexible, and potentially very costly due to the very large number of possible result datasets that would need to be precomputed for all possible use cases.

Data Leakage Avoidance in a Data Sharing Platform

The techniques introduced herein a mechanism that allows a client of a data sharing platform to make use of data for specified first purpose, whilst preventing use of the same data for an unspecified second purpose. In other words, in some aspects, the techniques herein introduce a mechanism to prevent exfiltration of valuable data for purposes other than those explicitly declared by the user and validated by the data platform. In some aspects, by making use of an 'intended use' schema, a group of rulesets, and/or and a series of validation stages, a data consumer is able to execute arbitrary query logic over a dataset. This may be done in such a way that allows the data consumer to extract the insights they require while allowing the data sharing platform to retain control over what underlying data is exposed, with a particular focus on preventing the exfiltration of data that the platform wishes to remain hidden.

Illustratively, the techniques described herein may be performed by hardware, software, and/or firmware, such as in accordance with query validation process 249, which may include computer executable instructions executed by the processor 220 (or independent processor of interfaces 210) to perform functions relating to the techniques described herein, in conjunction with data sharing process 248.

Specifically, according to various embodiments, a device receives, from a requestor, a query function that queries a dataset and an intended use schema associated with the query function. The device determines, using a policy ruleset, whether the intended use schema falls within an available schema for the dataset. The device executes the query function on the dataset to form a result data, when the intended use schema falls within the available schema for the dataset. The device provides the result data to the requestor.

Figure 3:
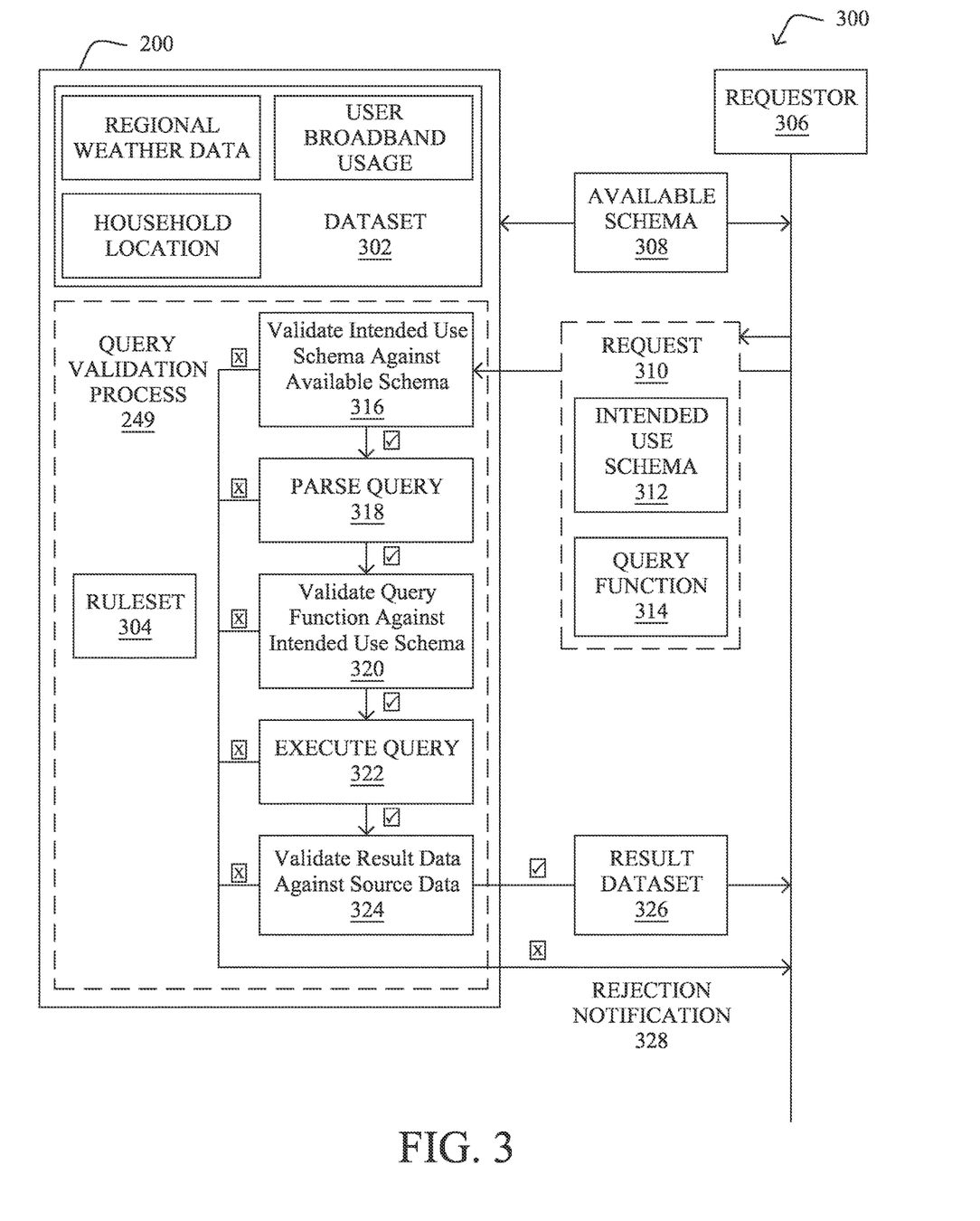
FIG. 3 illustrates an example architecture for data leakage avoidance in a data sharing platform.

Operationally, FIG. 3 illustrates an example architecture 300 for data leakage avoidance in a data sharing platform, according to various embodiments. At the core of architecture 300 is device 200 that provides a data sharing service to any number of clients, such as a requestor 306 (e.g., via a network), through execution of code authentication process 248. For instance, assume that device 200 maintains a dataset 302 of various data from different data subjects, such as regional weather data, user broadband usage data, household location data, or the like.

In various embodiments, device 200 may execute query validation process 249 as part of its data sharing service, either as a component of code authentication process 248 or in conjunction therewith. As would be appreciated, the functionalities of the various components of 200 may be combined or omitted, as desired. In addition, these components may be implemented on a singular device or in a distributed manner, in which case the combination of executing devices can be viewed as their own singular device for purposes of providing a data sharing service.

For purposes of illustration, assume that requestor 306, or an operator thereof, has already registered with the data sharing service provided by device 200 and has valid credentials. Typically, requestor 306 will be operated by a user to perform queries on the data sharing service. However, in other instances, requestor 306 may be configured to perform such queries, automatically.

In various embodiments, query validation process 249 may make use of a ruleset 304 that has been predefined, to control how requestor 306 can make use of the data in dataset 302. In one embodiment, ruleset 304 may define an 'available schema' that specifies what types of data are available in dataset 302. For instance, the available schema 308 for dataset 302 may be of the following form:
  Regional Weather: {fieldA: type, field B type, . . . }
  User Broadband Usage: {fieldA: type, fieldB type, . . . }
  Household Location: {fieldA: type, fieldB: type, . . . }

In some embodiments, prior to issuing a query function to the data sharing service, requestor 306 and device 200 may participate in an exchange during which device 200 provides the available schema 308 for dataset 302 to requestor 306. In doing so, requestor 306 is effectively notified as to the types of data in dataset 302. In addition, available schema 308 may also indicate to requestor 306 the potential ways that this data can be used when issuing query functions to the data sharing service.

At some point in time, requestor 306 may issue a request 310 to the data sharing service, to perform a query on dataset 302. In various embodiments, request 310 may include: 1.) an intended use schema 312 and/or 2.) a query function 314. Note that while intended use schema 312 and query function 314 are shown as being part of a single request 310, further embodiments provide for these to be sent separately by requestor 306 to the data sharing service.

In general, intended use schema 312 may indicate how query function 314 is going to use dataset 302 during execution of its query. For instance, assume that query function 314 will be aggregating certain data in dataset 302 and that the aggregated results are to be returned back to requestor 306 through execution of a query of the following form:

---

SELECT F1(fieldA) as area, F2(fieldB) as concentration
FROM...WHERE...GROUP BY...

. In such a case, intended use schema 312 may take the form:
{
  "type": "record",
  "name": "IntendedUseSchema"
  "fields":[
    {
      "name": "area"
      "type": {
        "type:": "enum",

```
        "symbols": ["NORTH", "SOUTH", "EAST", "WEST"]
      }
      "name": "concentration,"
      "type": {
        "type": "enum",
        "symbols": ["VERY_LOW", "LOW", "MEDIUM", "HIGH"
        "VERY_HIGH"]
      }
    }
  ]
}
```

In other words, schema 312 associated with query function 314 may specify what query function 314 is intending to do with dataset 302. To this end, in some embodiments, intended use schema 312 may be written using a schema definition language that is used by both the data sharing service and by requestor 306. Here, intended use schema 312 is essentially indicating to the service that query function 314 is going to be aggregating certain fields within dataset 302 into different group categories.

is According to various embodiments, query validation process 249 may perform a series of steps, to validate and execute request 310, as well as to return the results back to requestor 306. Initially, query validation process 249 may perform step 316, where it validates intended use schema 312 against available schema 308. This step is shown in greater detail in FIG. 4A, in various embodiments.

Figure 4A:
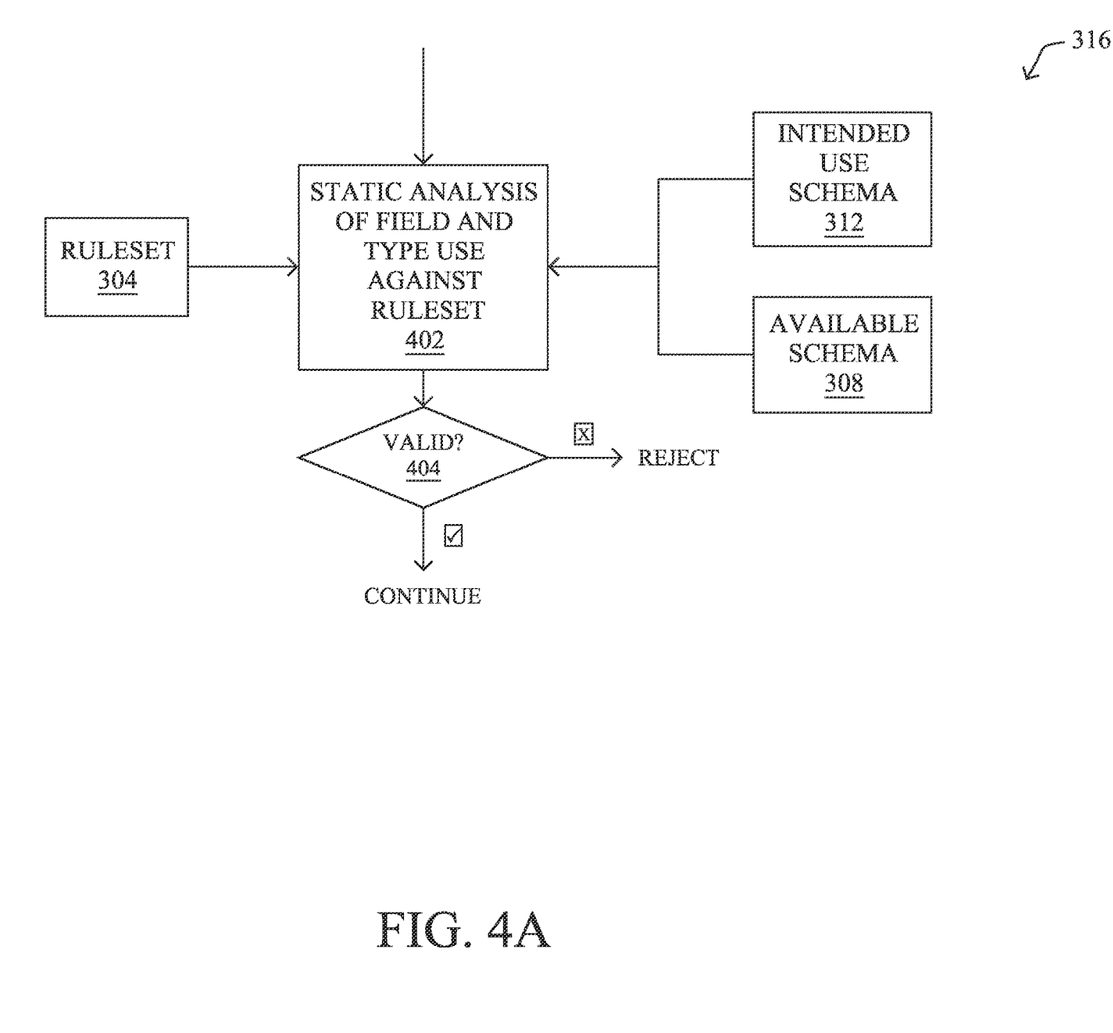
FIGS. 4A-4C illustrate example analysis operations by a data sharing platform to avoid data leakage.

As shown in FIG. 4A, step 316 may entail query validation process 249 performing a static analysis 402 of the field and type use of intended use schema 312, to ensure that it falls within available schema 308. To do so, query validation process 249 may make reference to its policy ruleset 304. Simple examples of rules in ruleset 304 may be 'allow the following enumeration to be used,' 'allow the following fields from the available schema to appear in the output,' and the like. For instance, a portion of ruleset 304 may specify:
"Intended Use": {"allowTypes":["enum", "boolean", "numeric" {"range":"0-100"}]}
"Broadband Usage Data":{"allowVerbatimUse":["fieldB"]}

At this point, query validation process 249 may make a determination 404 as to whether or not intended use schema 312 is valid. If so, query validation process 249 may proceed onto its next processing step. However, if intended use schema 312 is not valid query validation process 249 may cease further processing of request 310 and potentially notify requestor 306 that its query has been rejected.

Referring again to FIG. 3, if query validation process 249 has validated intended use schema 312, it may move on to step 318, where it parses query function 314. Query validation process 249 may, for instance, parse query function 314 into a form that can be processed by a query engine of data sharing service.

Once query function 314 has been parsed, query validation process 249 may perform step 320, where it validates query function 314 against intended use schema 312, in various embodiments. This step is shown in greater detail in FIG. 4B.

Figure 4B:
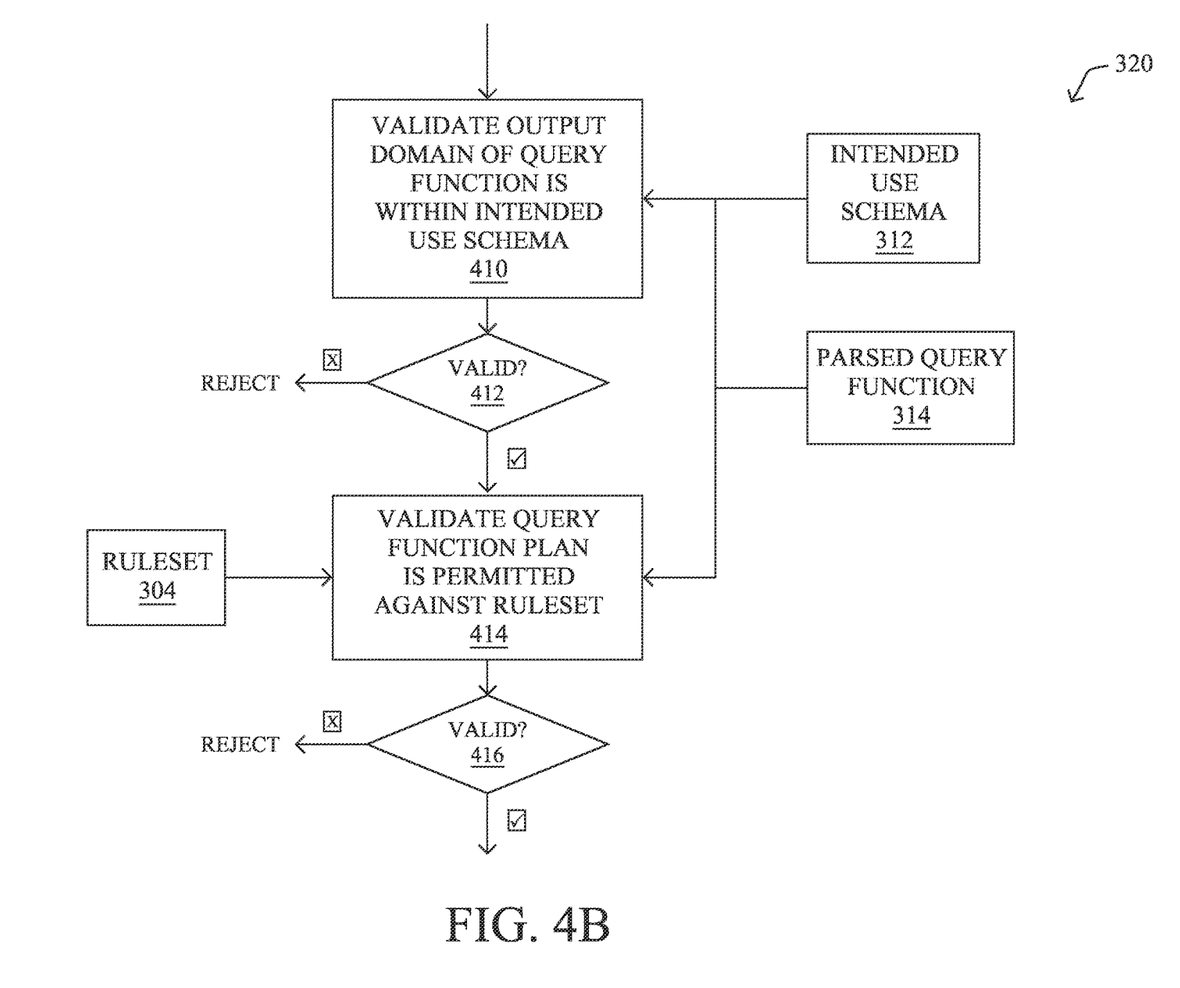

As shown in FIG. 4B, step 320 may entail query validation process 249 first performing a validation 410, to ensure that the output domain of the parsed query is function 314 falls within the scope of intended use schema 312. More specifically, validation 410 may entail comparing the types of search results for query function 314 to the stated intended use schema 312. If the domain of query function 314 falls partially or wholly outside of intended use schema 312, query validation process 249 may decide, at determination 412 that query function 314 is not valid. Otherwise, processing may then proceed to step 414.

At step 414, query validation process 249 may also validate whether the query function plan of query function 314 is permitted against ruleset 304, in further embodiments. For instance, assume that ruleset 304 states the following:
f(query plan):
  not op(select) & dat(value)==src(value)
  not op(min) & src(field) ==dataset.fieldA In other words, ruleset 304 may essentially say 'for a specific field, do not permit the query to select a value and use in it populating a specific field in the output' or 'do not allow a min( )operation over this specific field if another field appears in the output.' Thus, if query function 314 complies with ruleset 304, query validation process 249 may make a decision 416 that intended use schema 312 is a valid query. Conversely, if the query plan for query function 314 violates ruleset 304, query validation process 249 may determine at decision 416 that query function 314 is attempting an invalid query.

If query validation process 249 determines at determination 412 or decision 416 that query function 314 is not valid, it may cease further processing of request validation 410. In addition, in some instances, query validation process 249 may return a rejection notification to requestor 306, as well.

Referring yet again to FIG. 3, assuming that request 310 has passed processing step 320, query validation process 249 may then perform processing step 322 by executing the parsed query function 314, in some embodiments. In other words, query validation process 249 may retrieve the relevant data from dataset 302 and perform any specified operations in query function 314 to the retrieved data, to form a result dataset 326. For instance, result dataset 326 may be of the following form:
results: {NORTH: LOW, SOUTH: VERY_HIGH, WEST: MEDIUM, . . . }

According to various embodiments, prior to returning result dataset 326 to requestor 306, query validation process 249 may also perform a final processing step 324 where it validates result dataset 326 against the source data described by available schema 308. This step is shown in greater detail in FIG. 4C.

Figure 4C:
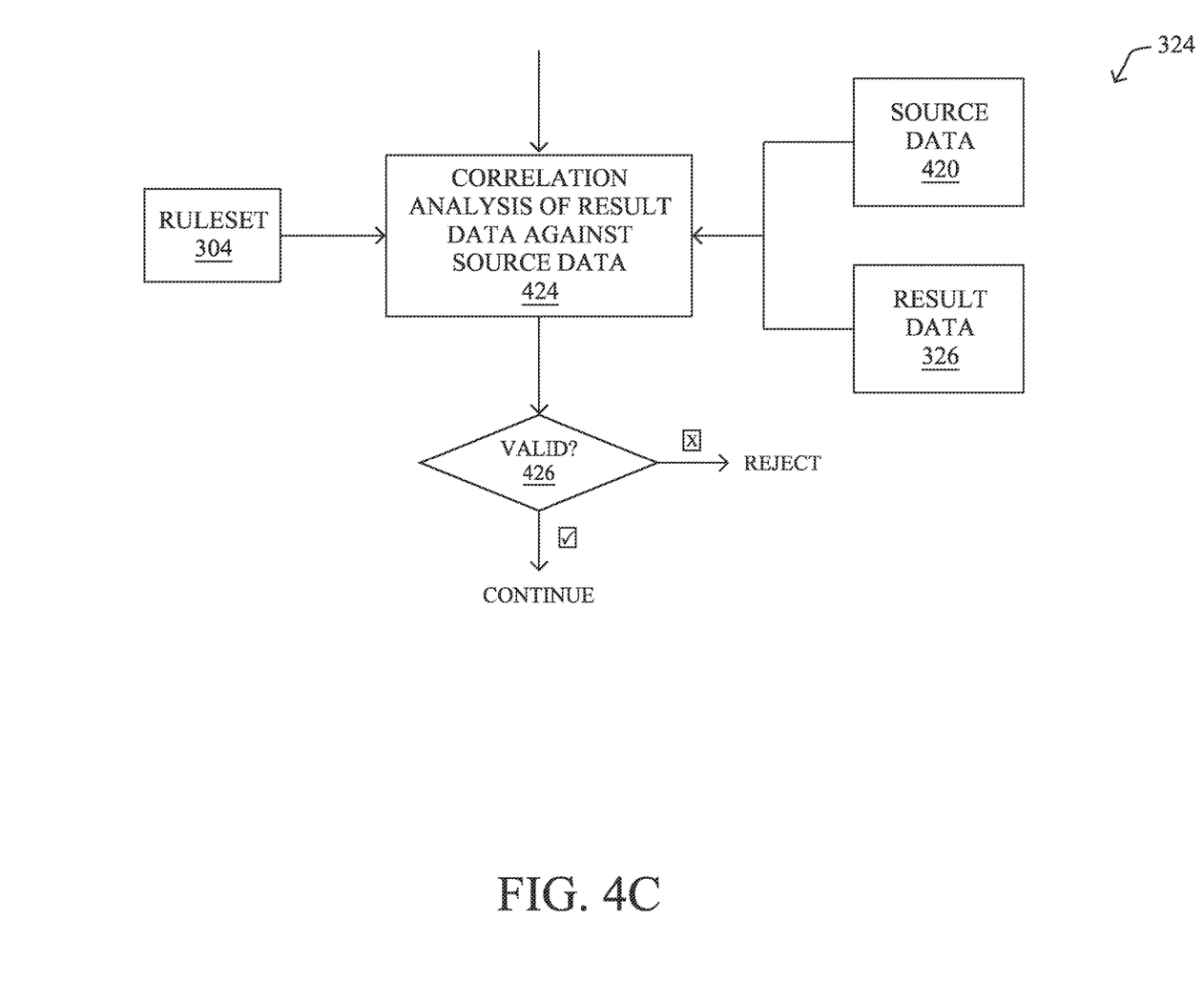

As shown in FIG. 4C, processing step 324 may entail query validation process 249 performing a correlation analysis 424 of result dataset 326 against source data 420, by referencing ruleset 304, in various embodiments. Here, the source data 420 refers to the actual data in dataset 302 that was queried using query function 314 (e.g., field A from the User Broadband Usage data, etc.).

Now, assume that ruleset 304 includes the following rule with respect to query results:
"Broadband Usage Data" {"copyProtect: ["fieldA", "fieldB"]}

In other words, ruleset 304 may essentially say 'ensure that field A and field B from the Broadband Usage Data in the dataset do not appear in any query results.' To determine whether or not this is the case, query validation process 249 may evaluate the strength of the relationship between these variables. In doing so, correlation analysis 424 may produce a confidence score as to whether field A appears or not, etc. In turn, query validation process 249 may compare this to a defined threshold in ruleset 304 to make a determination 426 as to whether result dataset 326 is valid or not. As with the previous processing steps, if query validation process 249 makes a determination 426 that result dataset 326 is invalid, it may cease further processing of query function 314 and/or issue a rejection notification back to requestor 306.

Referring yet again to FIG. 3, if the results of processing steps 316-324 are all valid, query validation process 249 may return the result dataset 326 to requestor 306, thereby fulfilling its search request. Conversely, if any of the validation checks in processing steps 316-324 fail, query validation process 249 may send a rejection is notification 328 to requestor 306 indicative of the reason for the failure (e.g., intended use schema 312 falls outside of the allowed scope of available schema 308, etc.).

As would be appreciated, architecture 300 thus allows a data subject and/or the operator of the data sharing service provided by device 200 to control not only which data consumers are allowed to access dataset 302, but also how that data can be used. In some instances, this may still allow requestor 306 to perform computations or other operations using the data in dataset 302, while also ensuring that any of the raw data values in dataset 302 are not actually included in the results.

Figure 5:
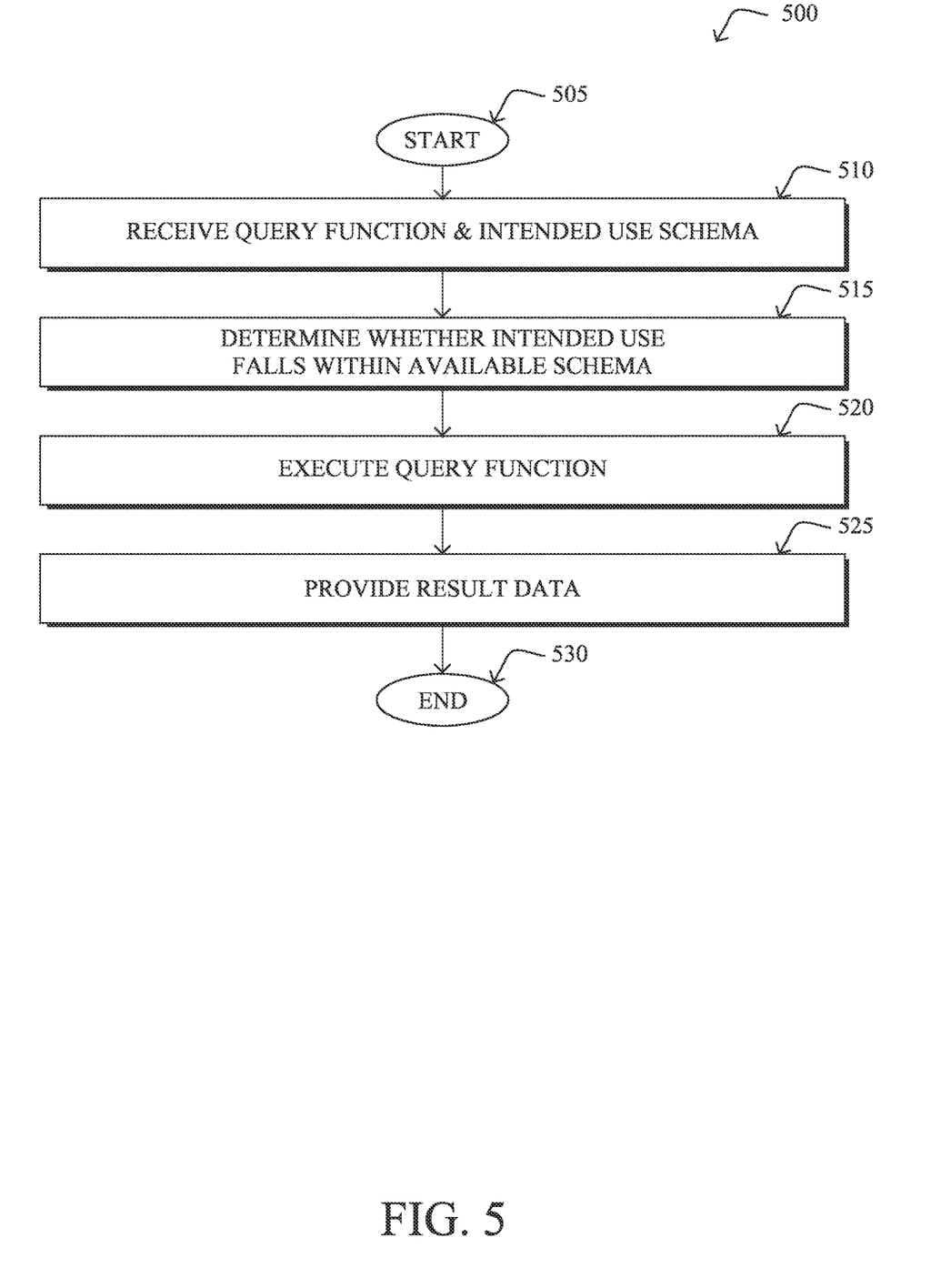
FIG. 5 illustrates an example simplified procedure for avoiding data leakage in a data sharing platform.

FIG. 5 illustrates an example simplified procedure 500 (e.g., a method) for avoiding data leakage in a data sharing platform, in accordance with one or more embodiments described herein. For example, a non-generic, specifically configured device (e.g., device 200), may perform procedure 500 by executing stored instructions (e.g., data sharing process 248 and/or query validation process 249), to provide a data sharing service to a network. The procedure 500 may start at step 505, and continues to step 510, where, as described in greater detail above, the device may receive, from a requestor, a query function that queries a dataset and an intended use schema associated with the query function. Typically, the query function and intended use schema will be received as part of a singular request. However, other embodiments provide for the two to be received by the device, separately. In some embodiments, the intended use schema may specify an expected schema for results data that results from execution of the query function.

At step 515, as detailed above, the device may determine, using a policy ruleset, whether the intended use schema falls within an available schema for the dataset. In some instances, the intended use schema and the available schema are specified using a common schema definition language. In one embodiment, the device may also provide the available schema to the requestor, prior to receiving the query function. In some embodiments, the device may make the determination in part by determining whether a data field indicated by the intended use schema is listed as an available field in the available schema. In other words, if the requestor intends to use data in the dataset that is is outside of that listed in the available schema, the device may reject the request.

At step 520, the device may execute the query function on the dataset to form a result data, when the intended use schema falls within an available schema for the dataset, as described in greater detail above. To do so, in some embodiments, the device may perform one or more computations on the dataset that are specified by the query function, to form the result data. In various embodiments, the device may also verify whether the query function is valid, prior to executing the query function. For instance, the device may determine whether an output domain of the query function is within the intended use schema and only execute the query function when the output domain of the query function is within the intended use schema.

At step 525, as detailed above, the device may provide the result data to the requestor. In some embodiments, prior to doing so, the device may further validate the result data using its policy ruleset and available schema. For instance, the policy ruleset may specify that a particular field in the dataset should not appear in the result data provided to the requestor. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for data leakage avoidance in a data sharing platform, it is to be understood that various other adaptations and modifications may be made within the spirit and scope of the embodiments herein. For example, while certain embodiments are described herein with respect to using certain schema formats, the techniques herein are not limited as such and other schemas may also be used to implement the techniques, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving, at a device and from a requestor, a query function that queries a dataset and an intended use schema associated with the query function, wherein the intended use schema specifies how the query function will use result data that results from execution of the query function;
determining, by the device and using a policy ruleset, whether the intended use schema falls within an available schema for the dataset;
executing, by the device, the query function on the dataset to form the result data, when the intended use schema falls within the available schema for the dataset; and
providing, by the device, the result data to the requestor, wherein determining whether the intended use schema falls within the available schema for the dataset comprises:
determining whether a data field indicated by the intended use schema is listed as an available field in the available schema.

2. The method as in claim 1, wherein the intended use schema and the available schema are specified using a common schema definition language.

3. The method as in claim 1, further comprising:
determining, by the device, whether an output domain of the query function is within the intended use schema, wherein the device executes the query function when the output domain of the query function is within the intended use schema.

4. The method as in claim 1, further comprising:
using the available schema and the policy ruleset to validate the result data, prior to providing the result data to the requestor.

5. The method as in claim 4, wherein the policy ruleset specifies that a particular field in the dataset should not appear in the result data.

6. The method as in claim 1, further comprising:
providing, by the device, the available schema to the requestor, prior to receiving the query function.

7. The method as in claim 1, wherein executing the query function on the dataset to form the result data comprises:
performing one or more computations on the dataset that are specified by the query function, to form the result data.

8. The method as in claim 1, further comprising:
sending a rejection notification to the requestor, when intended use schema sent by the requestor does not fall within the available schema for the dataset.

9. An apparatus, comprising:
one or more network interfaces;
a processor coupled to the one or more network interfaces and configured to execute one or more processes; and
a memory configured to store a process that is executable by the processor, the process when executed configured to:
receive, from a requestor, a query function that queries a dataset and an intended use schema associated with the query function, wherein the intended use schema specifies how the query function will use result data that results from execution of the query function;
determine, using a policy ruleset, whether the intended use schema falls within an available schema for the dataset;
execute the query function on the dataset to form the result data, when the intended use schema falls within the available schema for the dataset; and
provide the result data to the requestor,
wherein the apparatus determines whether the intended use schema falls within the available schema for the dataset by:
determining whether a data field indicated by the intended use schema is listed as an available field in the available schema.

10. The apparatus as in claim 9, wherein the intended use schema and the available schema are specified using a common schema definition language.

11. The apparatus as in claim 9, wherein the process when executed is further configured to:
determine whether an output domain of the query function is within the intended use schema, wherein the apparatus executes the query function when the output domain of the query function is within the intended use schema.

12. The apparatus as in claim 9, wherein the process when executed is further configured to:
use the available schema and the policy ruleset to validate the result data, prior to providing the result data to the requestor.

13. The apparatus as in claim 12, wherein the policy ruleset specifies that a particular field in the dataset should not appear in the result data.

14. The apparatus as in claim 9, wherein the process when executed is further configured to:
provide the available schema to the requestor, prior to receiving the query function.

15. The apparatus as in claim 9, wherein the apparatus executes the query function on the dataset to form the result data by:
performing one or more computations on the dataset that are specified by the query function, to form the result data.

16. A tangible, non-transitory, computer-readable medium storing program instructions that cause a device to execute a process comprising:
receiving, at the device and from a requestor, a query function that queries a dataset and an intended use schema associated with the query function, wherein the intended use schema specifies how the query function will use result data that results from execution of the query function;
determining, by the device and using a policy ruleset, whether the intended use schema falls within an available schema for the dataset;
executing, by the device, the query function on the dataset to form the result data, when the intended use schema falls within the available schema for the dataset; and
providing, by the device, the result data to the requestor,
wherein determining whether the intended use schema falls within the available schema for the dataset comprises:
determining whether a data field indicated by the intended use schema is listed as an available field in the available schema.

* * * * *

UNITED STATES PATENT AND TRADEMARK OFFICE
CERTIFICATE OF CORRECTION

| | |
|---|---|
| PATENT NO. | : 11,880,358 B2 |
| APPLICATION NO. | : 17/476951 |
| DATED | : January 23, 2024 |
| INVENTOR(S) | : Trevor George Smith et al. |

It is certified that error appears in the above-identified patent and that said Letters Patent is hereby corrected as shown below:

In the Specification

Column 7, Line 23 please amend as shown:
According to various embodiments, query validation Column 7, Line 62 please amend as shown:
that the output domain of the parsed query function 314

Column 9, Line 8 please amend as shown:
dation process 249 may send a rejection notification 328

Signed and Sealed this
Twenty-third Day of April, 2024

Katherine Kelly Vidal
*Director of the United States Patent and Trademark Office*